(12) United States Patent
Goman et al.

(10) Patent No.: US 7,934,364 B1
(45) Date of Patent: May 3, 2011

(54) RIDING MOWER CARRYING A PLURALITY OF CUTTING UNITS WITH TUNED MASS DAMPERS FOR DECREASING CUTTING UNIT BOBBING

(75) Inventors: Gerald E. Goman, Spring Valley, WI (US); Robert D. Patton, New Prague, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/715,932

(22) Filed: Mar. 2, 2010

Related U.S. Application Data

(63) Continuation of application No. 11/545,710, filed on Oct. 10, 2006, now Pat. No. 7,669,397, which is a continuation-in-part of application No. 11/367,039, filed on Mar. 2, 2006, now abandoned, which is a continuation of application No. 10/103,654, filed on Mar. 20, 2002, now Pat. No. 7,007,448.

(51) Int. Cl.
*A01D 34/53* (2006.01)
(52) U.S. Cl. ........................................ 56/249
(58) Field of Classification Search .............. 56/249, 56/294, 7
See application file for complete search history.

(56) References Cited

U.S. PATENT DOCUMENTS

| | | | | |
|---|---|---|---|---|
| 3,662,528 | A | * | 5/1972 | Akgulian et al. ............... 56/249 |
| 4,878,340 | A | * | 11/1989 | Roy et al. .......................... 56/249 |
| 5,628,169 | A | * | 5/1997 | Stiller et al. ........................ 56/7 |
| 5,647,726 | A | | 7/1997 | Sehgal et al. |
| 5,704,259 | A | | 1/1998 | Riehle |
| 5,862,654 | A | | 1/1999 | Thier et al. |
| 5,884,892 | A | * | 3/1999 | Gassen et al. ................. 248/635 |
| 6,010,407 | A | * | 1/2000 | Ishikawa .......................... 464/52 |
| 6,044,631 | A | * | 4/2000 | Anderson et al. .................... 56/7 |
| 6,203,454 | B1 | | 3/2001 | Nashif et al. |
| 6,419,214 | B2 | * | 7/2002 | Palinkas ........................ 267/141 |
| 7,007,448 | B2 | * | 3/2006 | Goman et al. .................. 56/249 |
| 7,191,584 | B2 | * | 3/2007 | Goman et al. .................. 56/249 |
| 7,581,374 | B1 | * | 9/2009 | Coffin .............................. 56/249 |
| 7,669,397 | B1 | * | 3/2010 | Goman et al. .................. 56/249 |

* cited by examiner

*Primary Examiner* — Árpád Fábián-Kovács
(74) *Attorney, Agent, or Firm* — James W. Miller

(57) ABSTRACT

An autonomous mass damper is positioned proximate to each reel cutting unit in a ganged configuration of such cutting units. One mass damper is preferably mounted or directly carried on each such reel cutting unit. The mass damper is free to move independently of vertical up and down movement of the reel cutting unit as the reel cutting unit travels over the ground. The mass damper is connected to the reel cutting unit by a coupler or by coupling components that allow the mass damper to move in a counter motion to vertical up and down bouncing or bobbing of the reel cutting unit. The counter motion of the mass damper lessens or damps the bouncing or bobbing of the reel cutting unit to provide a more consistent height of cut.

4 Claims, 19 Drawing Sheets

RIDING MOWER CARRYING A PLURALITY OF CUTTING UNITS WITH TUNED MASS DAMPERS FOR DECREASING CUTTING UNIT BOBBING

CROSS REFERENCE TO RELATED APPLICATIONS

This application is a continuation of application Ser. No. 11/545,710 filed Oct. 10, 2006, now U.S. Pat. No. 7,669,397, which is a continuation-in-part of application Ser. No. 11/367,039 filed Mar. 2, 2006 now abandoned, which is a continuation of application Ser. No. 10/103,654 filed Mar. 20, 2002, now U.S. Pat. No. 7,007,448.

TECHNICAL FIELD

This invention relates to a reel mower having reel cutting units that exhibit a rhythmic bouncing or bobbing during cutting of the grass. More particularly, this invention relates to a mass damper mounted inside the ground engaging roller(s) of such reel cutting units.

BACKGROUND OF THE INVENTION

Reel mowers are well known for cutting grass, often at close heights of cut. Many such reel mowers have a handle assembly that extends upwardly and rearwardly from the frame of the reel mower. This allows an operator who walks behind the reel mower during operation of the reel mower to grip and hold the handle assembly to guide and operate the reel mower. In many cases, the reel mower is self propelled by an internal combustion engine carried on the frame of the reel mower. This engine also provides power to the rotatable reel of the reel mower.

The internal combustion engine provided on many reel mowers is often a single cylinder engine. Such an engine characteristically produces vibration in the frame of the reel mower as the engine operates. This vibration interferes with the precision cutting afforded by the reel mower. Some way of reducing or compensating for the vibrations induced by the engine, or such other vibrational excitation source as might be present, would be advantageous.

In reel mowers having a plurality of ganged reel cutting units, such as reel mowers in the form of riding vehicles, the reel cutting units have been observed bouncing or bobbing vertically as the reel cutting units are propelled over the ground. Such bouncing or bobbing interferes with providing a consistent height of cut since grass will be cut higher when the reel cutting unit bounces up and lower when the reel cutting unit bounces down. This manifests itself in the cut grass swath in a washboard effect that appears as a plurality of alternating darker and lighter lateral strips in the swath. It would be an advance in the art to be able to eliminate or lessen this washboard effect by eliminating or reducing the magnitude of the bouncing or bobbing of the reel cutting units.

SUMMARY OF THE INVENTION

One aspect of this invention relates to a mower which comprises a frame supported for movement over the ground. A plurality of individual grass cutting units are carried on the frame to be propelled by the frame over the ground. Each cutting unit is individually supported for rolling over the ground by at least one ground engaging member carried on each cutting unit. At least one individual mass damper is positioned at least proximate to each one of the individual cutting units. Each mass damper comprises an autonomous body that is supported out of contact with the ground during operation of the cutting unit as the cutting unit rolls over the ground. The body of the mass damper is free to move relative to the cutting unit and relative to the frame and has a mass that is chosen to produce a vertical movement of the body of the mass damper that counters a vertical bouncing or bobbing of the cutting unit as the cutting unit rolls overs the ground.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
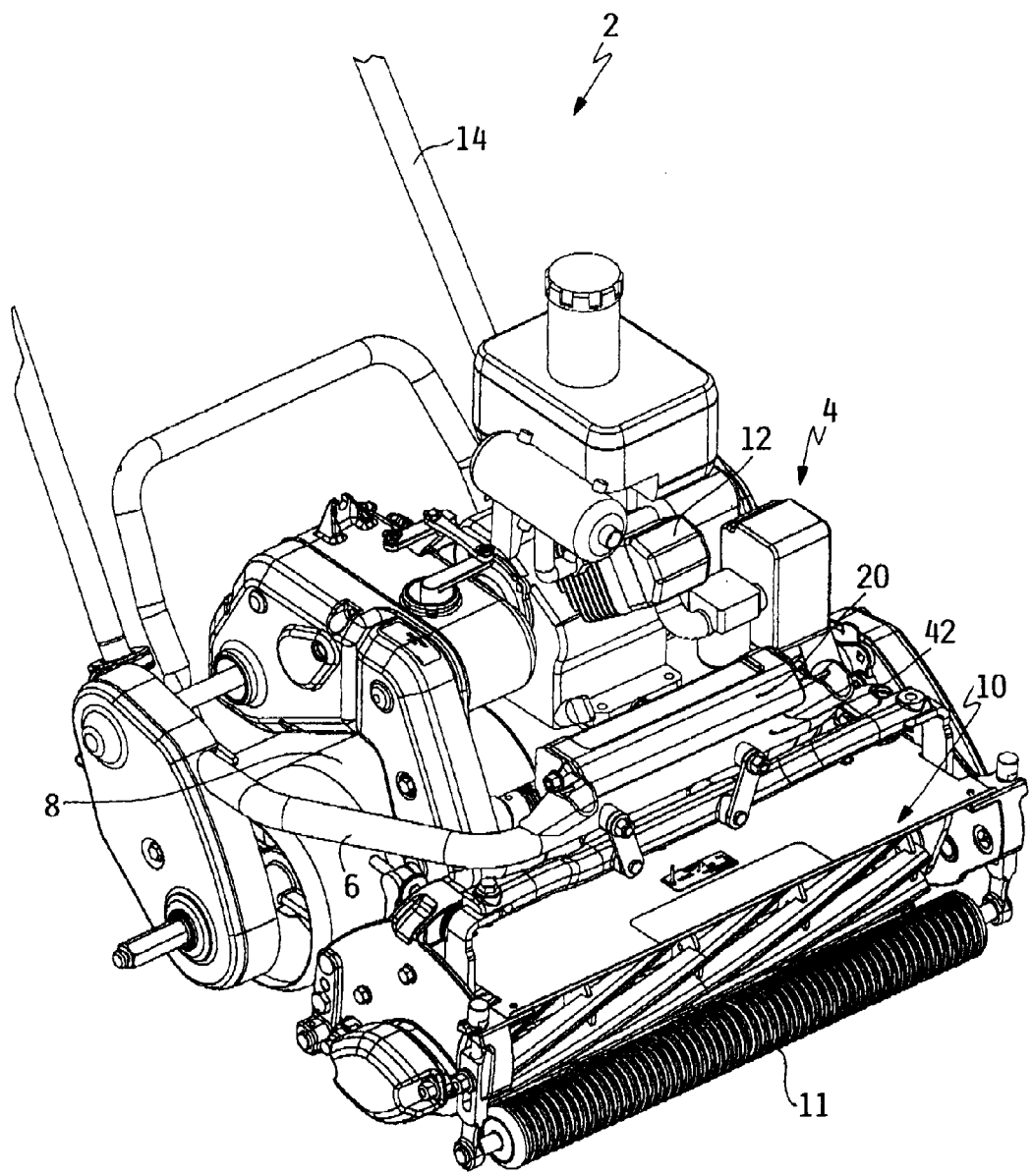
FIG. 1 is a perspective view of one type of reel mower, namely of a walk greensmower, having a mass damper for reducing vibration induced in the frame of the reel mower by the internal combustion engine carried on the frame.
Figure 2:
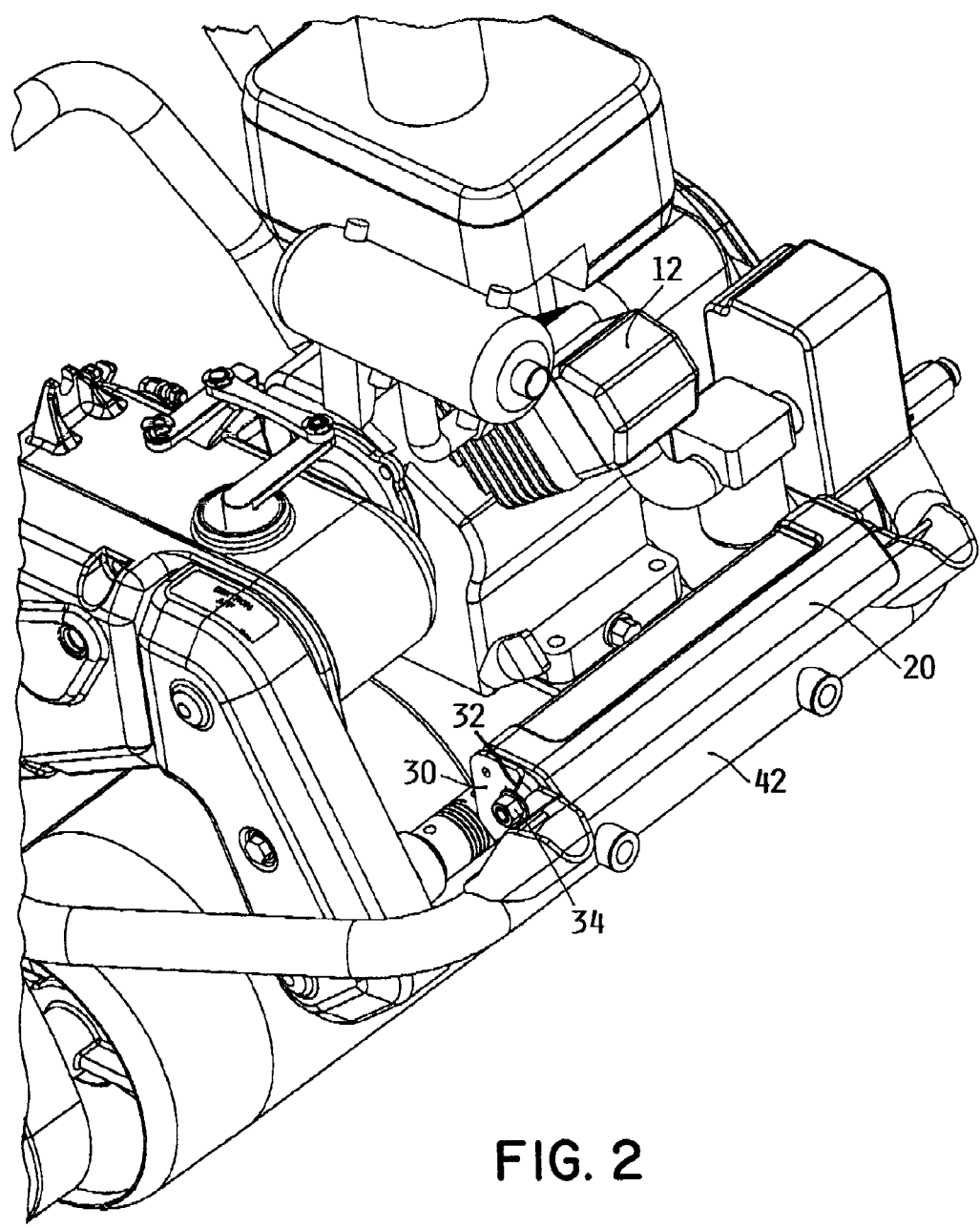
FIG. 2 is an enlarged perspective view of a portion of the reel mower of FIG. 1, more particularly illustrating the mass damper.

A reel mower is illustrated generally as 2 in FIG. 1. Reel mower 2 as shown in FIG. 1 comprises a walk greensmower 4. However, the depiction of a walk greensmower 4 herein is for illustrative purposes and is not meant to be a representation of the only type of reel mower 2 with which this invention could be used. Reel mower 2 could also comprise a reel mower having a plurality of reel type cutting units attached to the frame of a riding vehicle, such as a reel mower known as a triplex mower. Thus, reel mower 2 could have just one reel type cutting unit 10 or a plurality of such cutting units 10.

Walk greensmower 4 includes a frame 6 that is supported for movement over the ground during operation of walk greensmower 4 by a rear traction drum 8. A reel type cutting unit 10 is carried on the front of frame 6 for mowing grass. Cutting unit 10 is preferably carried on frame 6 in such a manner that cutting unit 10 is able to float or pivot relative to frame 6 about at one or multiple axes to allow cutting unit 10 to better follow the contours of the ground. Cutting unit 10 is supported for rolling over the ground by its own front and rear rollers 11, with only the front roller 11 being illustrated in FIG. 1.

Additional details regarding cutting unit 10 and how it is connected to frame 6 may be found in International Publication WO 02/00007, dated Jan. 3, 2002, which is hereby incorporated by reference.

A single cylinder internal combustion engine 12 is provided on frame 6 for powering both cutting unit 10 and traction drum 8. A handle assembly 14 extends upwardly and rearwardly from frame 6 to allow an operator to grip and hold handle assembly 14 to thereby guide frame 6 during operation of reel mower 2.

Figure 3:
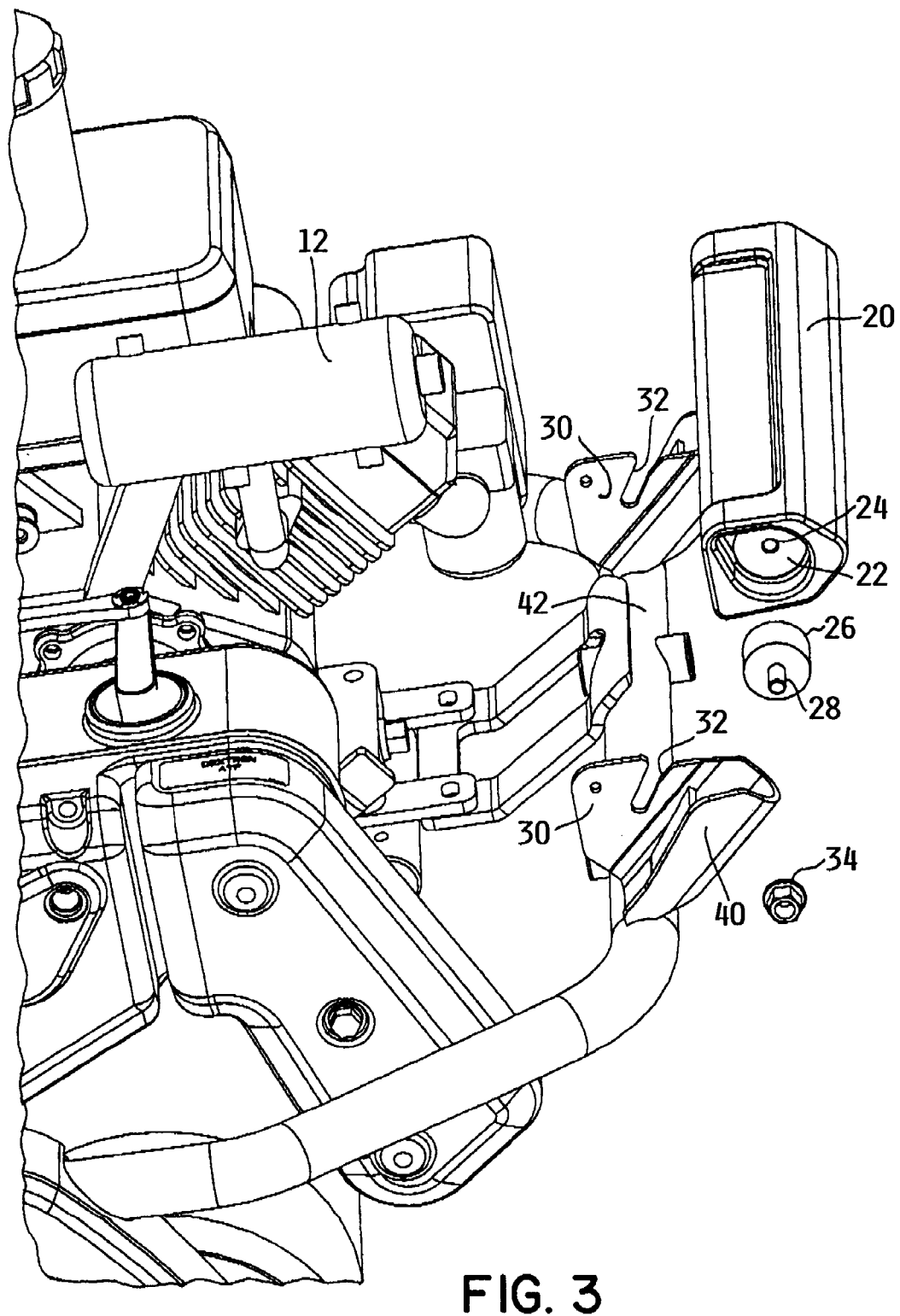
FIG. 3 is an enlarged perspective view of a portion of the reel mower of FIG. 1, more particularly illustrating in exploded form the mass damper and one of the elastomeric couplers that couple the mass damper to the frame of the reel mower.

This invention relates to a mass damper 20 that is attached to frame 6 of walk greensmower 4. Mass damper 20 is in the form of an elongated bar, but the shape of mass damper 20 can vary and is not important to this invention. Each end of mass damper 20 has a recess or cavity 22 provided therein, one cavity 22 at one end of mass damper 20 being shown in FIGS. 3 and 4. Each cavity 22 includes a threaded circular bore 24 extending into the interior of mass damper 20.

Figure 4:
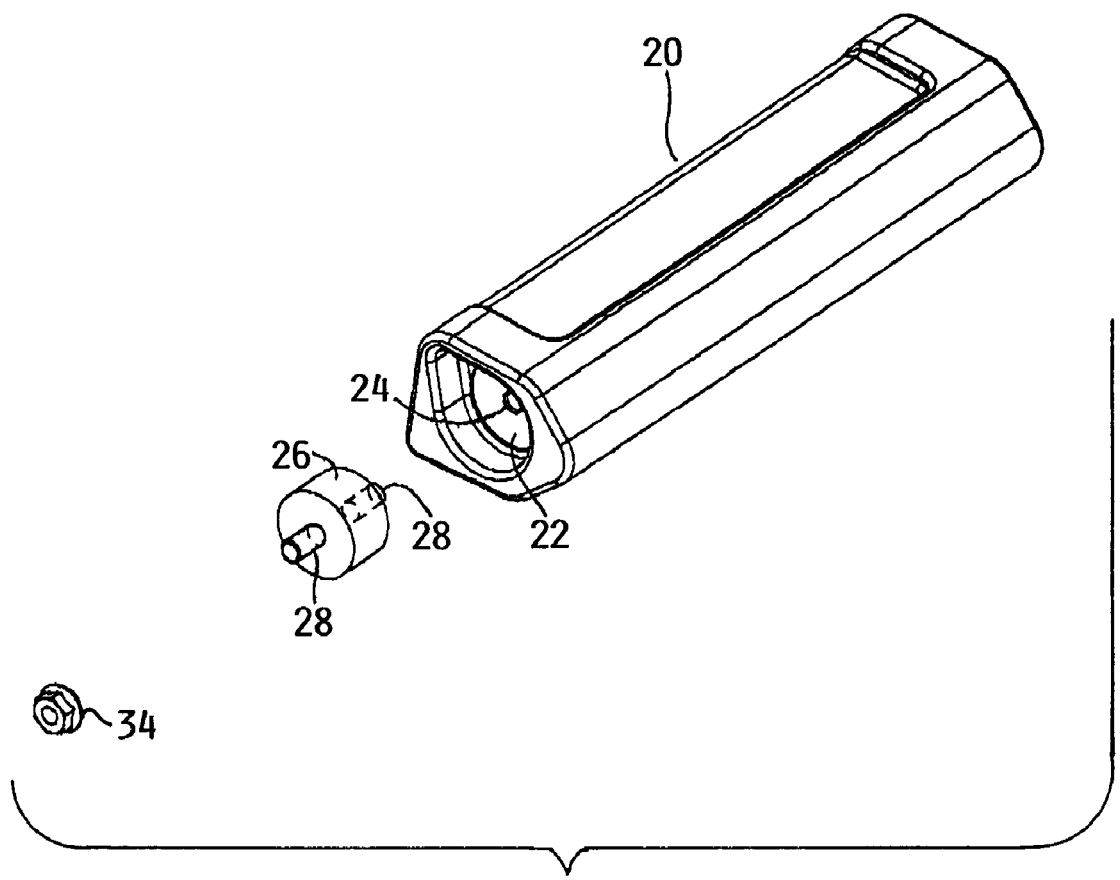
FIG. 4 is an enlarged perspective view in exploded form of the mass damper and one of the elastomeric couplers that couple the mass damper to the frame of the reel mower.

Each end of mass damper 20 is coupled to frame 6 of walk greensmower 4 by a cylindrical elastomeric coupler 26, such as a coupler made of rubber. Opposite faces of coupler 26 are provided with stub shafts 28 that extend outwardly from the opposite faces of coupler 26. Thus, one stub shaft 28 extends to the left of coupler 26 and the other stub shaft 28 extends to the right of coupler 26 as shown in FIG. 4. The ends of stub shafts 28 are threaded.

One coupler 26 is attached to each end of mass damper 20 by taking coupler 26 and placing coupler 26 into the cavity 22 on one end of mass damper 20 and by rotating coupler 26 to thread stub shaft 28 on one face of coupler 26 into threaded bore 24 in cavity 22. Cavity 22 is sized to substantially enclose coupler 26 after installation. Thus, when both couplers 26 have been installed, couplers 26 will be substantially enclosed in cavities 22 on each end of mass damper 20 with the exception that the other stub shaft 28 on each coupler, i.e. the stub shaft 28 on the opposite face of coupler 26, will stick out from each side of mass damper 20 much like the handles on a rolling pin.

Two mounting brackets 30 are provided on frame 6 of walk greensmower 4. Mounting brackets 30 are spaced apart by a distance that is sufficient to allow mass damper 20 to be placed between them. Each mounting bracket 30 includes an upwardly extending slot 32. Each outwardly protruding stub shaft 28 on each end of mass damper 20, namely each stub shaft 28 that sticks out from each end of mass damper 20 after couplers 26 are installed in cavities 22 on each end of mass damper 20, is simply dropped down into slot 32 on bracket 30. A nut 34 is then threaded onto the threaded end of stub shaft 28 to clamp stub shaft 28 against the side of bracket 30.

When so assembled, each coupler 26 has one stub shaft 28 clamped to a bracket 30 on frame 6 and the other stub shaft 28 is screwed into one end of mass damper 20. The elastomeric material forming coupler 26 is interposed between these two stub shafts and unites stub shafts 28 together but with stub shafts 28 not being directly connected to one another. Motion between the two stub shafts 28 is permitted, but only by twisting or shearing the elastomeric material forming coupler 26 between the two stub shafts 28.

Brackets 30 used to attach mass damper 20 to frame 6 of walk greensmower 4 can be formed as extended flange portions of saddles 40 that mount a grass collecting basket (not shown) to frame 6 of walk greensmower 4. However, brackets 30 need not be formed as part of something else, but could simply be separate brackets 30 attached to some portion of frame 6 of walk greensmower 4, i.e. to the cross tube 42 shown in FIG. 3. Thus, brackets 30 could be entirely separate from the grass basket saddles 40 if so desired.

During operation of reel mower 2, operation of engine 12 will induce a rhythmic vibration in frame 6 of walk greensmower 4 which is or greatest amplitude in a particular frequency range. In the case of walk greensmower 4 shown herein, the frequency range of concern is 14-20 hz. This vibration is transmitted to mass damper 20 through couplers 26 by a shearing action in couplers 26, i.e. by twisting couplers 26 between their stub shafts 28 as described above rather than by compression of couplers 26. This force transmission to mass damper 20 will induce a counter movement in mass damper 20 that is sufficient to substantially damp engine vibration in the frequency range of concern, i.e. in the 14-20 hz range for walk greensmower 4 shown in FIG. 1.

This results in much less vibration being transmitted to reel cutting unit 10. Thus, reel cutting unit 10 can cut more precisely and consistently even at low heights of cut since cutting unit 10 is not being vibrated or jiggled as much as it would have been without mass damper 20.

The weight of mass damper 20 has to be selected in conjunction with the stiffness of couplers 26 to damp vibration in the desired frequency range according to the following formula:

$$F = \frac{1}{2\pi} \sqrt{\frac{K}{M}}$$

where F=Frequency, K=Spring Constant of the Elastomeric Coupler, and M=Mass of the Mass Damper. For a walk greensmower 4 of the type shown herein powered by a 3.5 hp single cylinder internal combustion engine 12, a mass damper weighing 11 pounds coupled to frame 6 by rubber couplers sold by Barry Controls of Brighton, Mass, Model A32151 isolators, will effectively damp engine vibrations in the 14 to 20 hz range.

Figure 5:
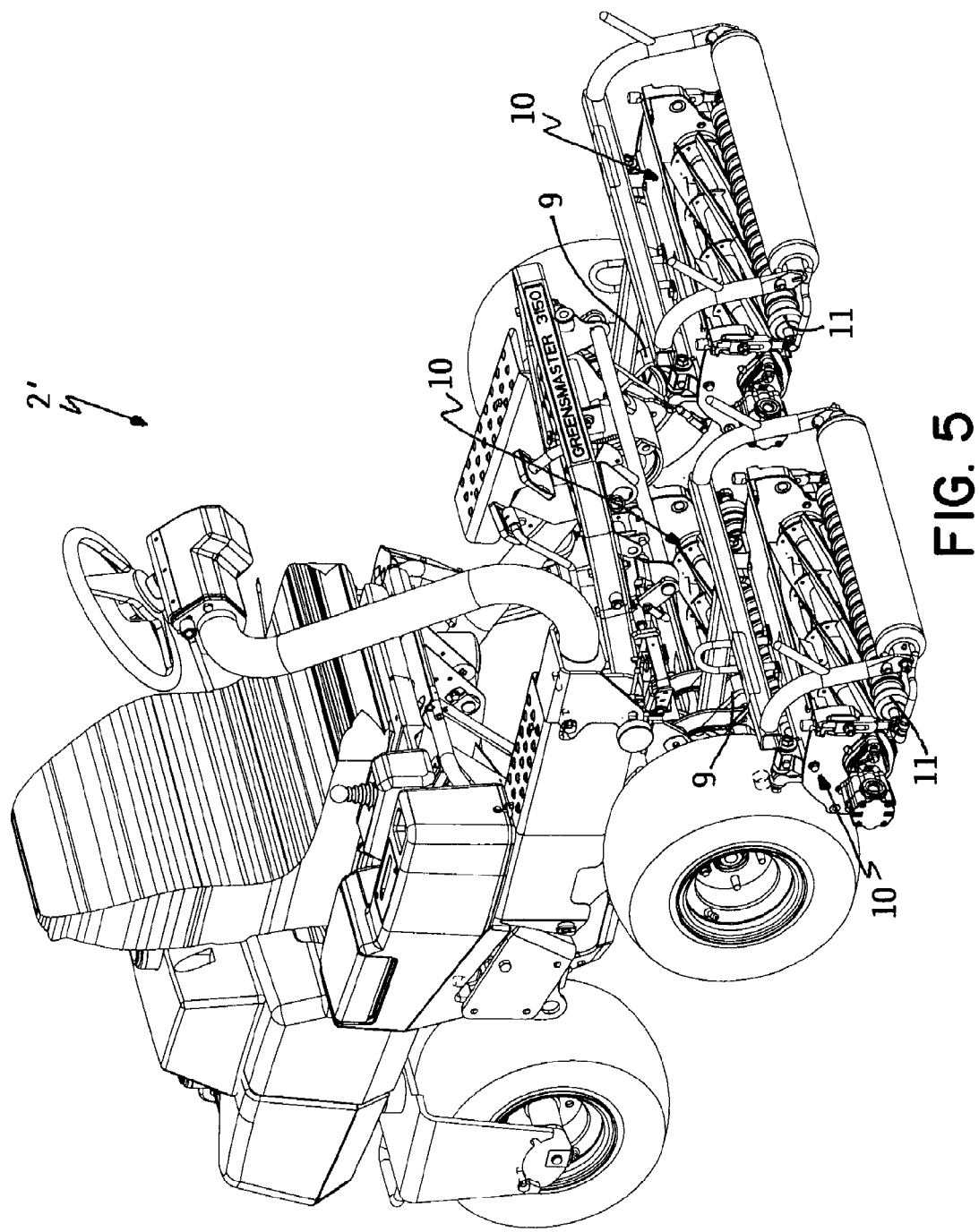
FIG. 5 is a perspective view of a reel mower comprising a riding vehicle having a plurality of reel cutting units in a ganged configuration, each such reel mower being of the type that can be equipped with any of the mass dampers described in FIGS. 6-18 for damping or lessening rhythmic motion of each reel cutting unit as the vehicle is driven over the ground and the reel cutting units roll on the ground.

Various modifications of this invention will be apparent to those skilled in the art. For example, while engine 12 is one vibrational excitation source shown herein, this invention would be useful for damping vibrations arising from some other vibrational excitation source. Considering a triplex reel mower 2' as shown in FIG. 5, such a reel mower 2' has a plurality of reel cutting units 10 each carried on the end of a lift arm 9 that joins the reel cutting unit 10 to a riding vehicle. In such a reel mower 2', the reel cutting units 10 sometimes exhibit a rhythmic bouncing that is undesirable. A properly sized mass damper placed on the end of each lift arm supporting each reel cutting unit 10, or at such other location as may be appropriate, should help reduce such bouncing by damping the vibrations caused by the vibrational excitation source, which in this case would obviously not be an internal combustion engine.

In addition, while movement of mass damper 20 is permitted by a shearing action of couplers 26, this invention is not limited to the use of a shearing action in couplers 26. Mass damper 20 could be coupled to frame 6 by at least one elastomeric coupler 26 that is deflected by compressing coupler 26 or through a combination of compression and shearing.

FIGS. 6-18 illustrate various additional mass dampers $20_b$-$20_e$ according to this invention for use on reel mower 2'. The letter suffix behind the number 20 is intended to differentiate the different mass dampers from one another. In other words, mass damper 20 will refer to the first mass damper shown in FIGS. 1-4, mass damper $20_b$ will refer to the second mass damper shown in FIGS. 6 and 7, mass damper $20_c$ will refer to the third mass damper shown in FIGS. 8 and 9, and so on. However, the same reference numerals will be used for components that are common to the different embodiments of mass dampers 20. In other words, the reference numeral 26 will always refer to the elastomeric couplers 26, the reference numeral 28 will always refer to the stub shafts protruding from such couplers 26, etc. When the additional mass dampers $20_b$-$20_e$ have new structure or components not found in mass damper 20, new reference numerals will be used to refer to such new structure or components.

Each of the additional mass dampers $20_b$-$20_e$ is capable of being used on each reel cutting unit 10 carried on a reel mower 2' of the type shown in FIG. 5. Such a mower 2' has three cutting units 10 as shown in FIG. 5 arranged in a triplex configuration, i.e. two front cutting units 10 arranged ahead of the front wheels of mower 2' along with a center cutting unit 10 arranged under mower 2' between the front and rear wheels thereof. Alternatively, mower 2' could comprise a fiveplex having three front cutting units 10 with the gaps therebetween being covered by two rear cutting units 10. The numbers of front and rear cutting units 10 in these configurations could be reversed with the triplex having a single front cutting unit and two rear cutting units. Thus, the specific number and placement of the cutting units 10 is not important to this invention, though typically there will be a plurality of ganged reel cutting units 10 carried and propelled by the riding mower 2'.

One problem with a reel mower 2' of this type is a rhythmic bouncing or bobbing of cutting units 10 as reel mower 2' is driven over the ground. During a grass cutting operation, each reel cutting unit 10 is self supporting on the ground and rolls over the ground by virtue of its own front and rear ground engaging rollers 11. Thus, while each reel cutting unit 10 is pushed forwardly by the riding mower 2' through the lift arm 9 or other suitable drive connection, the weight of each reel cutting unit 10 is independently carried on the ground during cutting by the front and rear rollers 11 of cutting unit 10. The rhythmic bouncing or bobbing of the cutting units can be observed as a primarily vertical, up and down hopping motion of cutting units 10.

The Applicants have discovered that the rhythmic bouncing or bobbing described above occurs in a frequency range that is determined primarily by the weight of cutting units 10 as well as by the stiffness or hardness of the turf over which cutting units 10 are rolling. For reel mowers 2' of the type used to cut fairways on golf courses where the turf is typically softer and the grass is being cut higher than on the greens of a golf course, the rhythmic bouncing or bobbing occurs generally in the 7 to 10 hz frequency range. The turf on a golf course green is often much harder and the grass is cut to much lower heights of cut than on a fairway. Thus, for reel mowers 2' of the type used to cut grass on the greens of a golf course, the rhythmic bouncing or bobbing will have a higher frequency range, generally in the 10 to 14 hz range. However, as noted, the specific frequency range varies depending upon the weight of cutting unit 10 and the characteristics of the turf over which cutting unit 10 is operating.

The bouncing or bobbing of a cutting unit is not desirable as it interferes with the quality of cut. A reel cutting unit 10 that bounces or bobs as it rolls over the ground will not cut grass as evenly, i.e. to a consistent height of cut, as one that does not. The various mass dampers shown in FIGS. 6-18 are all designed to damp or lessen the rhythmic bouncing or bobbing of such reel cutting units 10.

Figure 6:
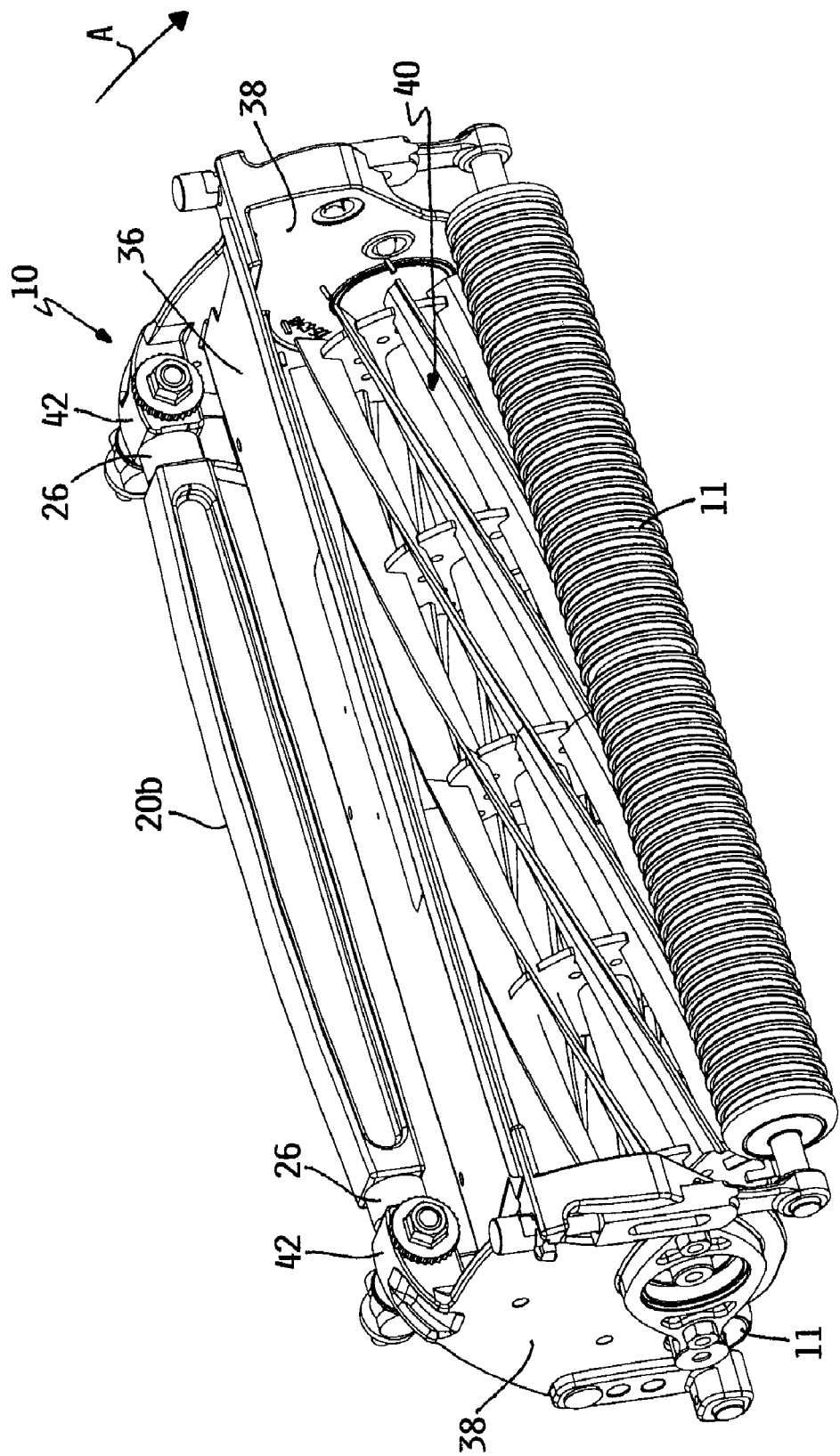
FIG. 6 is a perspective view of one of the reel cutting units of the mower of FIG. 5, particularly illustrating a second mass damper according to this invention mounted on the cutting unit above the top wall of the cutting unit.

Before describing mass dampers $20_b$-$20_e$, reference should be had to FIG. 6 for a description of the basic components of a reel cutting unit 10. Each reel cutting unit 10 includes a frame comprising a top wall 36 and a pair of side plates or side walls 38. A helically bladed reel 40 extends between and is rotatably journalled in side walls 38 of cutting unit 10. A bedknife (not shown) cooperates with reel 40. As reel 40 rotates, the blades on reel 40 push grass against the bedknife to sever the grass. The position of the bedknife against reel 40 can be periodically adjusted using a pair of bedknife adjusters 42 to accommodate wear in the blades of reel 40 or in the bedknife.

As noted above, each cutting unit normally has a pair of rotatable ground engaging rollers 11 extending across the width of cutting unit 10. These rollers comprise a front roller 11 carried in advance of reel 40 and a rear roller 11 carried behind reel 40. Front roller 11 is often grooved or ribbed from one end to the other as shown in FIG. 6. Rear roller 11 is normally smooth. However, front roller 11 could be smooth if so desired. As the mower 2' travels forwardly over the ground and pushes cutting unit 10 ahead in the forward direction indicated by the arrow A in FIG. 6, rollers 11 support cutting unit 10 for rolling over the ground.

The mass dampers $20_b$-$20_d$ shown in FIGS. 6-11 are all variations of mass damper 20 shown in FIGS. 1-4. All of the mass dampers 20-$20_d$ comprise a mass damper of an appropriate mass that is coupled to a frame by a pair of elastomeric couplers 26. However, one difference between mass dampers $20_b$-$20_d$ and mass damper 20 is that mass dampers $20_b$-$20_d$ are coupled directly to various portions of reel cutting units 10 on mower 2'. In addition, the weight of the mass dampers $20_b$-$20_d$ and the stiffness of the couplers 26 are designed to damp the rhythmic bouncing or bobbing sometimes seen on such a cutting unit 10 instead of vibrations from a single cylinder engine. With that having been said, mass dampers $20_b$-$20_d$ will now each be individually described.

Figure 7:
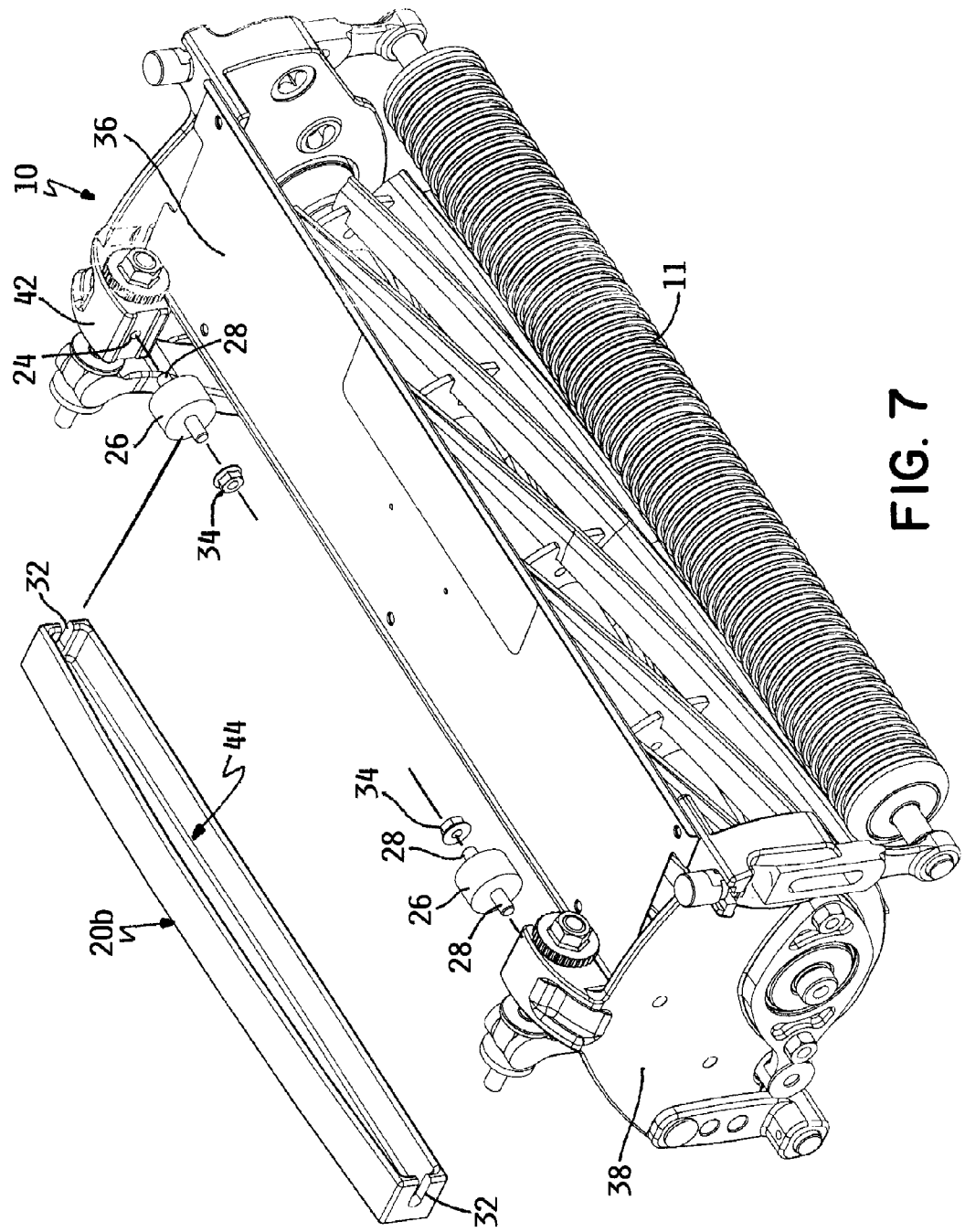
FIG. 7 is a perspective view similar to FIG. 6, but showing the second mass damper in exploded form relative to the cutting unit.

Referring first to FIGS. 6 and 7, mass damper $20_b$ is in the form of an elongated bar much like mass damper 20. A pair of elastomeric couplers 26 having stub shafts 28 couple each end of mass damper $20_b$ to bedknife adjusters 42 carried on the top of cutting unit 10. Each bedknife adjuster 42 has a threaded bore 24 into which one stub shaft 28 on one coupler can be threaded.

The other stub shaft 28 on each coupler 26 is clamped by a nut 34 to a slot 32 on each end of mass damper $20_b$. Mass damper $20_b$ has an elongated recess 44 along one face thereof with recess 44 extending between slots 32. Recess 44 allows nuts 34 to be threaded onto stub shafts 28 after stub shafts 28 have been inserted through slots 32. When so assembled on reel cutting unit 10, mass damper $20_b$ will be positioned generally above top wall 36 of cutting unit 10 as shown in FIG. 6.

Figure 8:
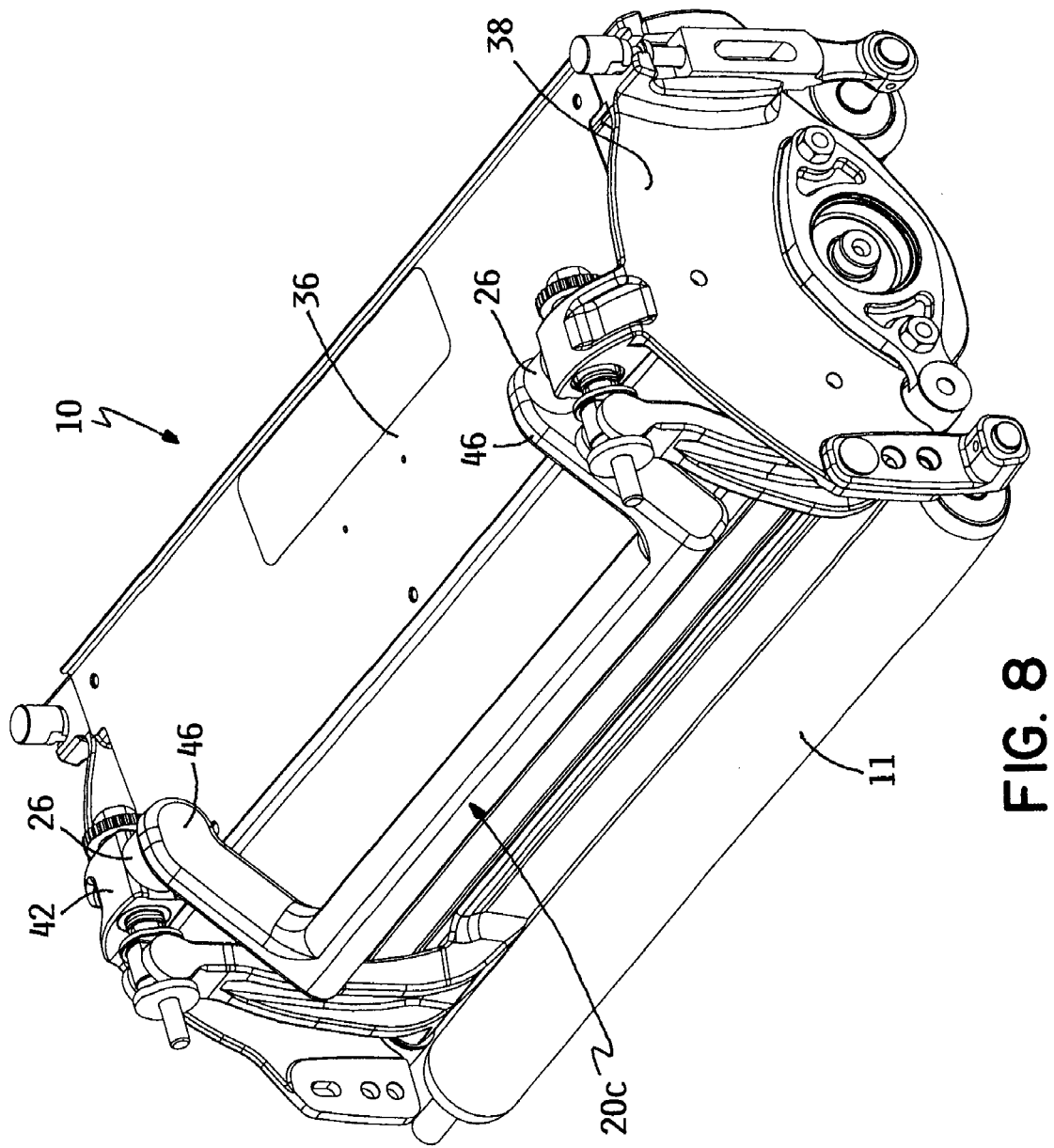
FIG. 8 is a perspective view of one of the reel cutting units of the mower of FIG. 5, particularly illustrating a third mass damper according to this invention mounted on the cutting unit generally behind and below the top wall of the cutting unit and generally over the rear roller.
Figure 9:
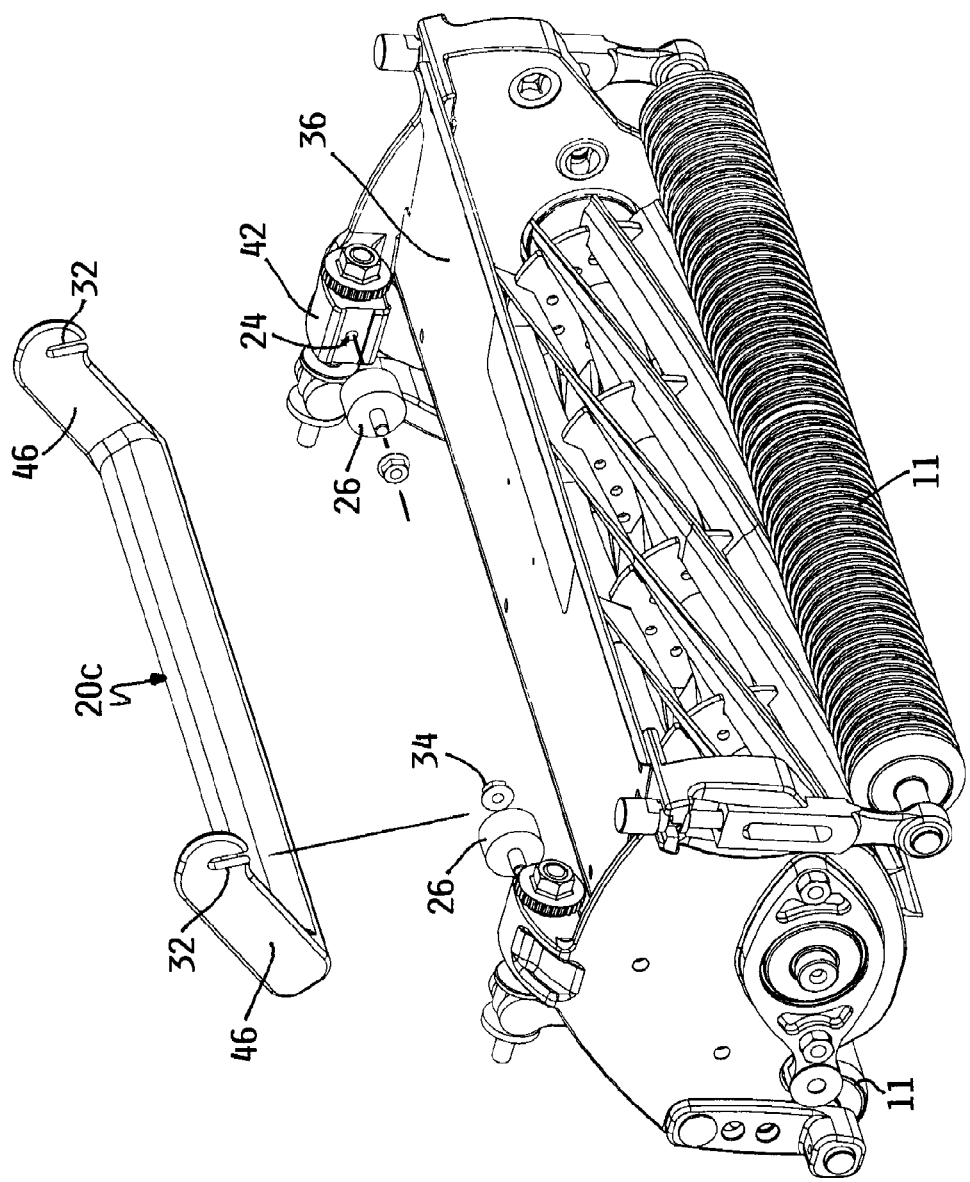
FIG. 9 is a perspective view similar to FIG. 8, but showing the third mass damper in exploded form relative to the cutting unit.

The mass damper $20_c$ shown in FIGS. 8 and 9 is similar to mass damper $20_b$, except that a pair of forwardly extending attachment arms 46 are located on either end of the central bar shaped portion of mass damper $20_c$. Thus, mass damper $20_c$ has an overall U-shape given the forward extension of attachment arms 46. Attachment arms 46 carry slots 32, which now face downwardly, to allow the mass damper $20_c$ to be clamped to the inwardly facing stub shafts 28 of elastomeric couplers 26. When so assembled, attachment arms 46 angle upwardly as they extend forwardly so that the central bar shaped portion of mass damper $20_c$ is positioned somewhat below and behind top wall 36 of cutting unit 10 as shown in FIG. 8.

Figure 10:
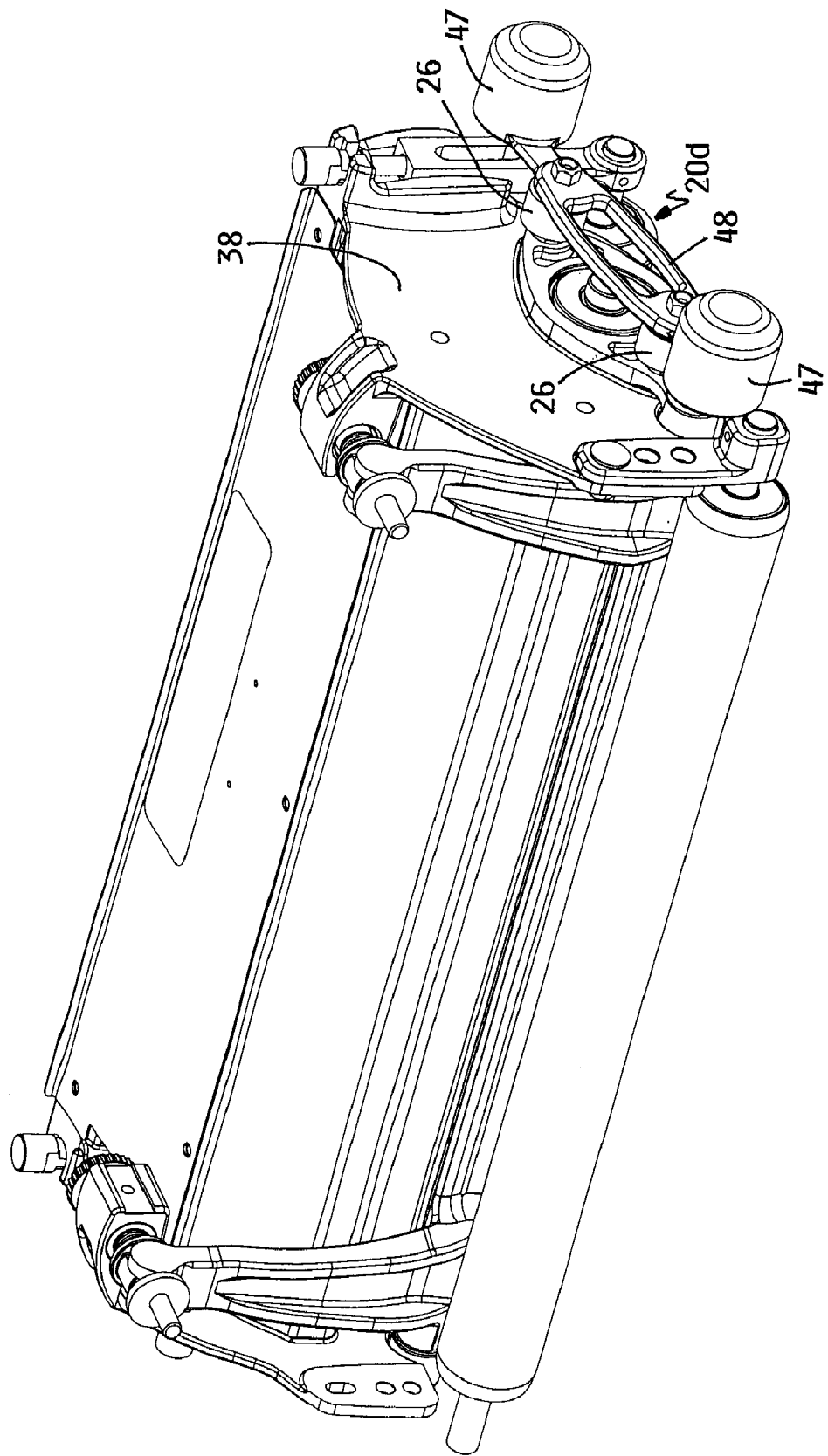
FIG. 10 is a perspective view of one of the reel cutting units of the mower of FIG. 5, particularly illustrating a fourth mass damper according to this invention mounted on the cutting unit to a side wall of the cutting unit.
Figure 11:
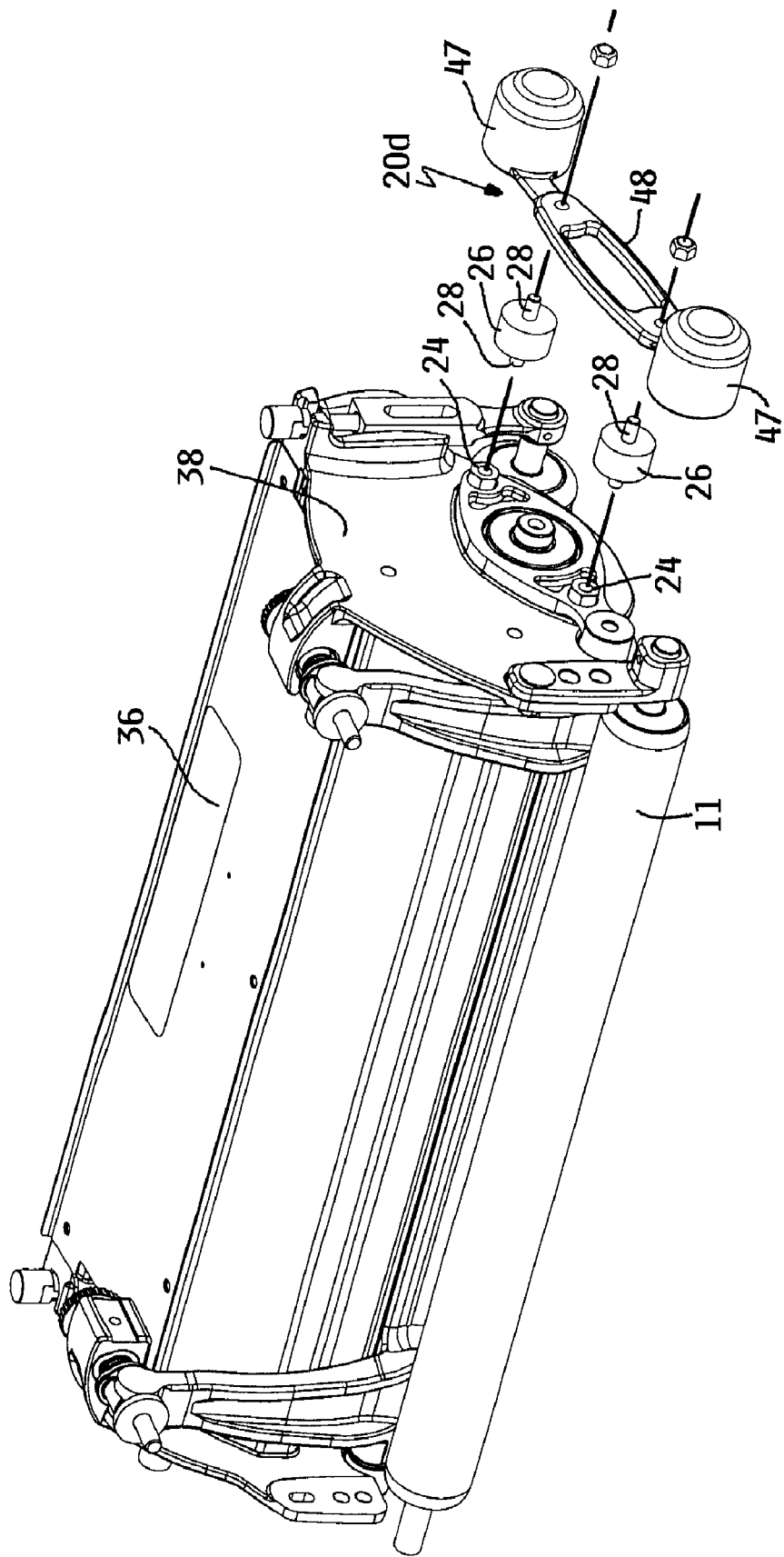
FIG. 11 is a perspective view similar to FIG. 10, but showing the fourth mass damper in exploded form relative to the cutting unit.
Figure 12:
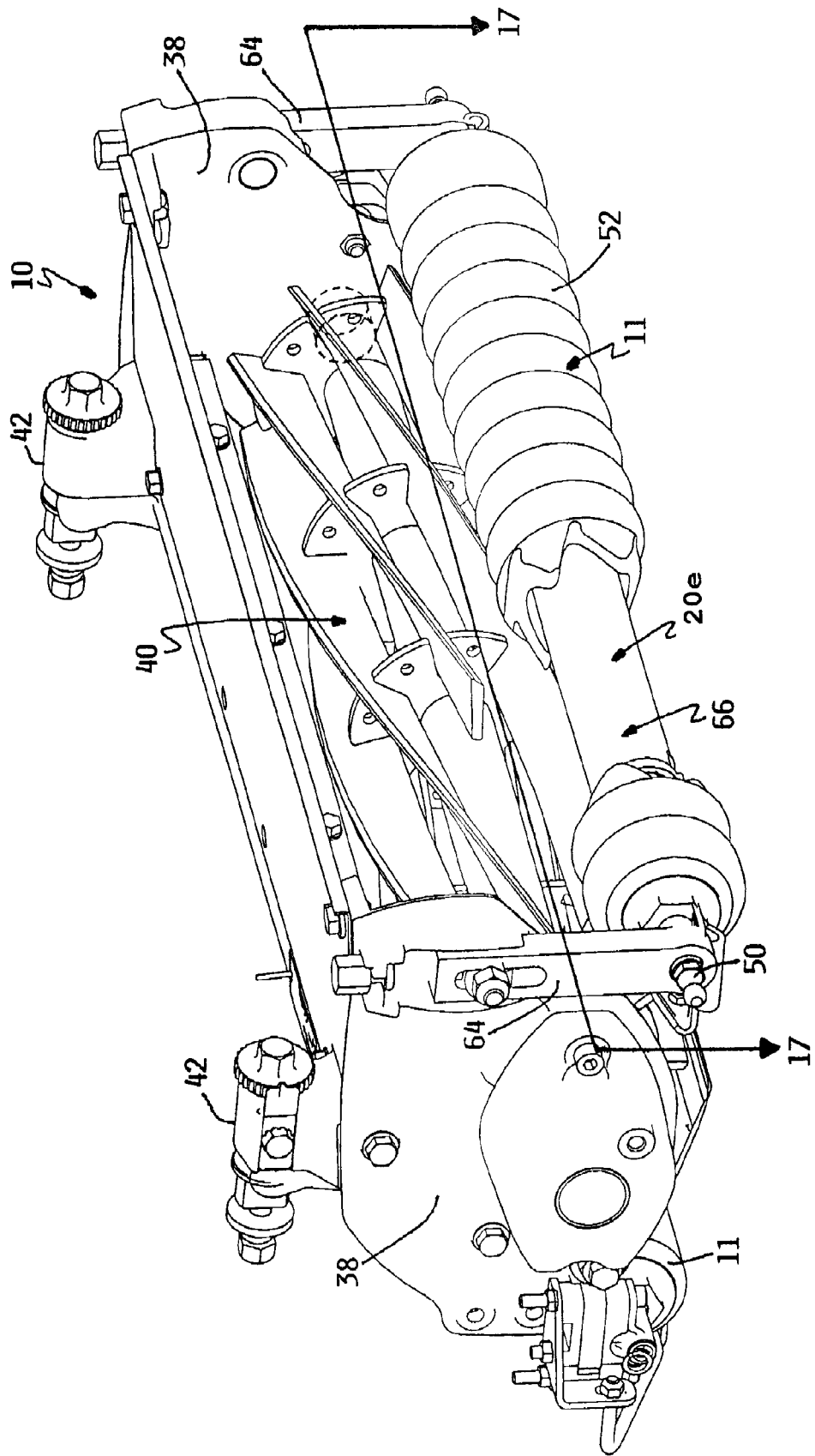
FIG. 12 is a perspective view of one of the reel cutting units of the mower of FIG. 5, particularly illustrating a portion of a fifth mass damper according to this invention mounted on the cutting unit within the front roller of the cutting unit with another mass damper of this type also being preferably mounted within the rear roller of the cutting unit.
Figure 13:
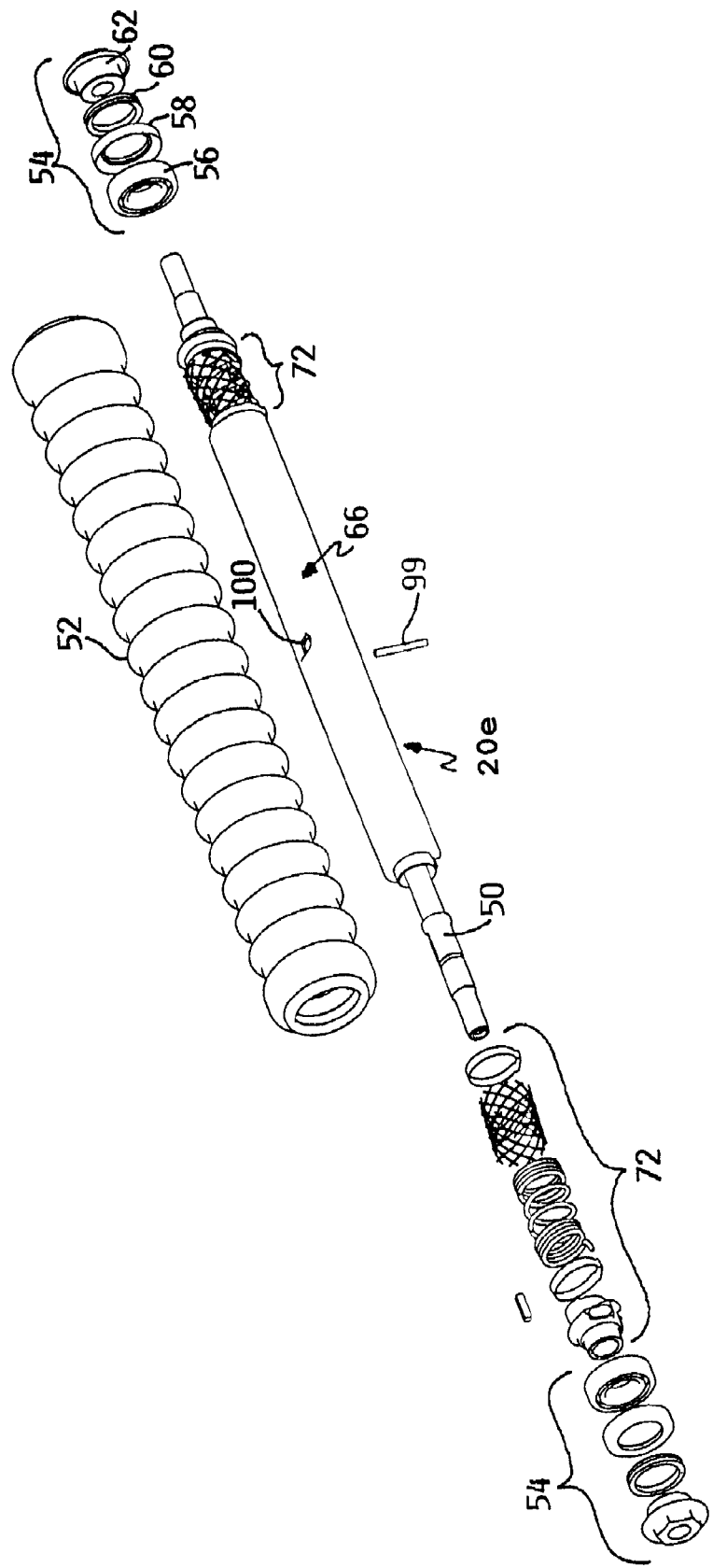
FIG. 13 is a perspective view of the front roller of the cutting unit of FIG. 12, particularly illustrating the fifth mass damper of FIG. 12 removed from the roller body but still in place around a roller through shaft with the support and coupling components for the left end of the fifth mass damper further being shown in exploded form relative to the roller through shaft and with the support and coupling components for the right end of the fifth mass damper being shown in assembled form on the roller through shaft.

Referring now to FIGS. 10 and 11, another mass damper $20_d$ is shown, but mass damper $20_d$ no longer has an elongated bar shape. Instead, mass damper $20_d$ is shaped like a barbell with two spaced weights or masses 47 carried on either end of a central connecting member 48. The elastomeric couplers 26 have one stub shaft 28 threaded into bores 24 on one side wall 38 of cutting unit 10. The remaining stub shafts 28 are then inserted through holes in central connecting member 48 of mass damper $20_d$ and the mass damper $20_d$ is then clamped in place by the nuts 34.

When so assembled, the mass damper $20_d$ is located adjacent and outboard one side wall 38 of cutting unit 10. Side wall 38 that carries mass damper $20_d$ is preferably opposite to side wall 38 that mounts the hydraulic or electric motor used to rotate reel 40. Thus, mass damper $20_d$ also serves to counterbalance the motor weight in addition to its rhythmic motion damping duty.

A characteristic of the mass dampers just described is their placement on the exterior of cutting unit 10. Mass damper $20_b$ is located above top wall 36, mass damper $20_c$ is located generally behind and below top wall 36 and above rear roller 11, and mass damper $20_d$ is located outboard of one side wall 38 of cutting unit 10. While this is believed to be effective from a motion damping perspective, it does present certain clearance challenges relative to the lift arms 9 or other mower components. For example, putting a mass damper $20_b$ above top wall 36 of cutting unit 10 could mean redesigning and potentially raising the lift arm 9 for cutting unit 10 to provide sufficient clearance for mass damper $20_b$. This may not be desirable from an aesthetic or functional standpoint.

Turning now to FIGS. 12-18, an additional mass damper $20_e$ according to this invention will now be described. Mass damper $20_e$ differs from mass dampers 20-$20_d$. First, mass damper $20_e$ is housed internally in one or more of the ground engaging rollers 11 of cutting unit 10. Thus, it does not present the same clearance problems as the other mass dampers $20_b$-$20_d$. Secondly, the construction of mass damper $20_e$ is different from the other dampers and is believed to be unique.

Each front and rear roller 11 used on cutting unit 10 has a non-rotatable through shaft 50. A roller body 52 rotates around through shaft 50. Each end of roller body 52 is rotatably supported on opposite ends of through shaft 50 by identical left and right stacks 54 of roller body mounting and sealing components. Each of these component stacks 54 comprises a roller bearing 56, a cup shaped seal 58, an elastomeric V-ring 60, and a nut 62 that is threaded onto a threaded portion of through shaft 50 to force roller bearing 56, seal 58 and V-ring 60 into place. When each of the component stacks 54 is assembled on each end of through shaft 50, roller body 52 is retained on through shaft 50 but is free to rotate around through shaft 50.

Thus, rollers 11 used as the front and rear rollers are of the type which comprise rotatable roller bodies 52 that rotate around a central, non-rotatable through shaft 50. The ends of through shaft 50 are preferably long enough to extend beyond roller body 52 and into a height of cut adjuster 64 positioned on each side wall 38 of cutting unit 10. See FIG. 12. Height of cut adjusters 64 will raise and lower the ends of through shaft 50 to adjust the height of cut of cutting unit 10. Rollers 11 of this type, namely rollers having roller bodies 52 that rotate around central, non-rotatable through shafts 40, as well as height of cut adjusters 64 are themselves well known per se in the mower art and need not be further described herein.

Mass damper $20_e$ of this "roller enclosed" embodiment comprises a hollow cylinder 66 that is concentrically received around through shaft 50 between the outer diameter of through shaft 50 and the inner diameter of roller body 52. The cylinder of mass damper $20_e$ is actually in two parts that are rigidly secured to one another, i.e. an inner steel tube 68 with an outer tube 70 surrounding and being cast directly to inner steel tube 68. See FIG. 18. Outer tube 70 is preferably made of lead to maximize the weight of mass damper $20_e$ for a given length thereof. Inner steel tube 68 protrudes past each end of the outer lead tube to provide a surface for coupling mass damper $20_e$ to through shaft 50. See FIGS. 17 and 18.

Each end of mass damper $20_e$ is supported and coupled to through shaft 50 by an identical set 72 of support and coupling components. See FIG. 13. Thus, only one such set 72 of components need be described herein as the set of components on the other end are the same.

Figure 14:
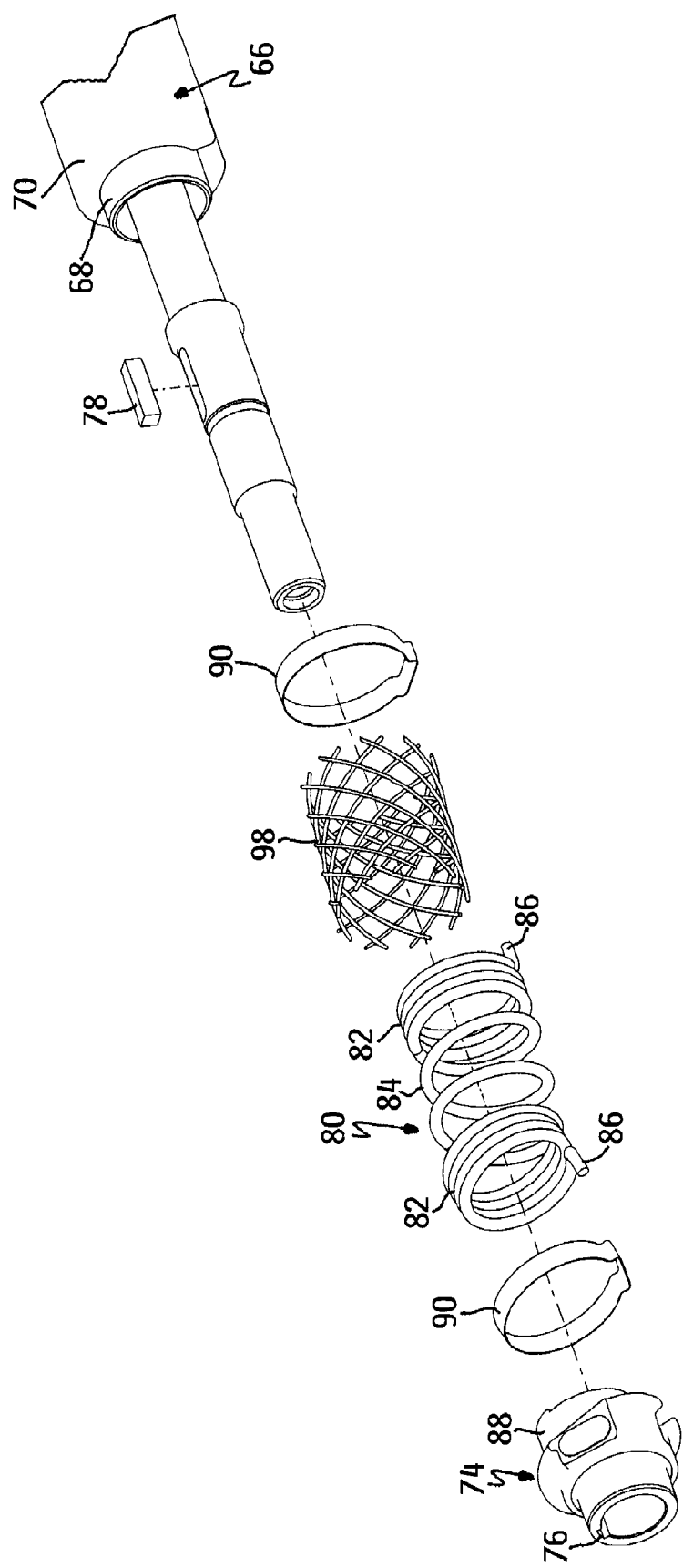
FIG. 14 is an enlarged perspective view of one end of the roller through shaft of the front roller of FIG. 13, particularly illustrating the fifth mass damper positioned around the roller through shaft with the support and coupling components for the illustrated end of the mass damper being shown in exploded form relative to the roller through shaft.
Figure 15:
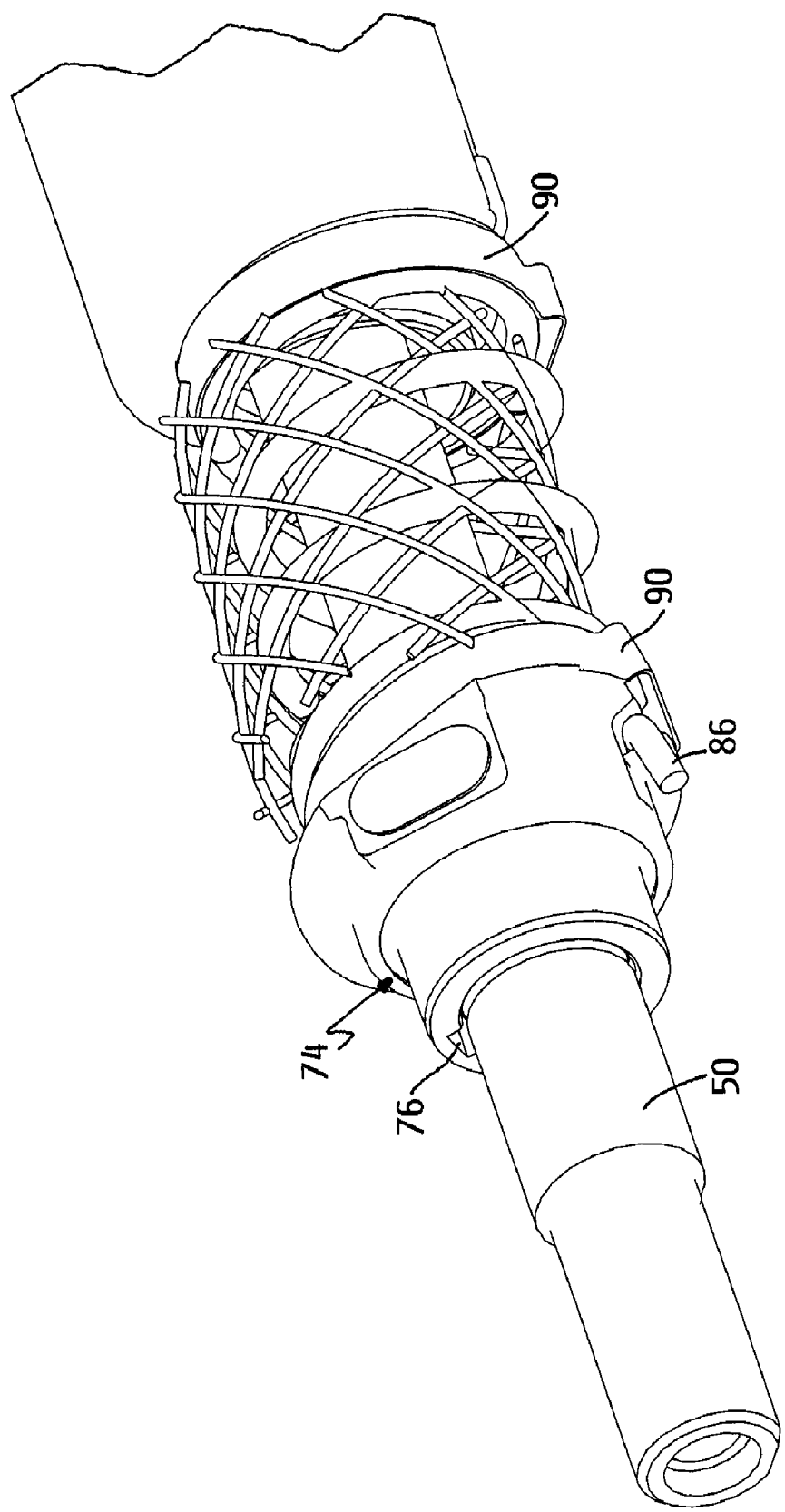
FIG. 15 is an enlarged perspective view similar to FIG. 14, particularly illustrating the support and coupling components for the illustrated end of the mass damper in assembled form on the roller through shaft.
Figure 16:
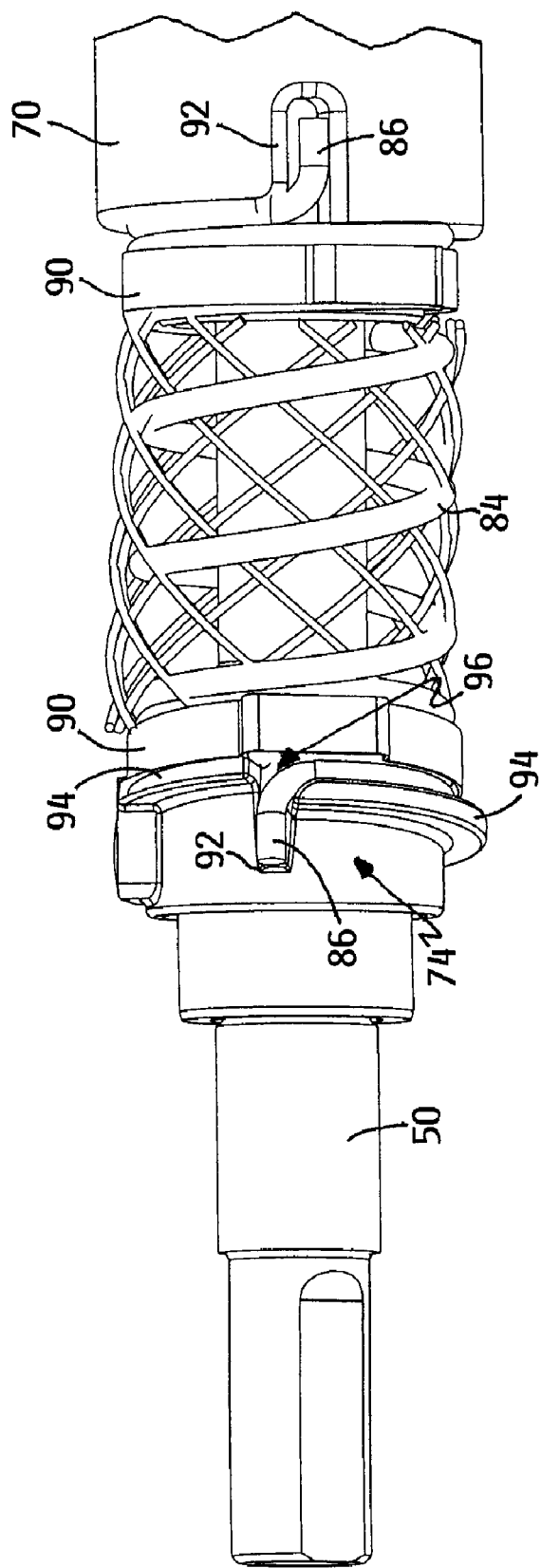
FIG. 16 is an enlarged top plan view of one end of the roller through shaft of the front roller of FIG. 13, particularly illustrating the fifth mass damper positioned around the roller through shaft with the support and coupling components for the illustrated end of the mass damper being shown in assembled form on the roller through shaft.
Figure 17:
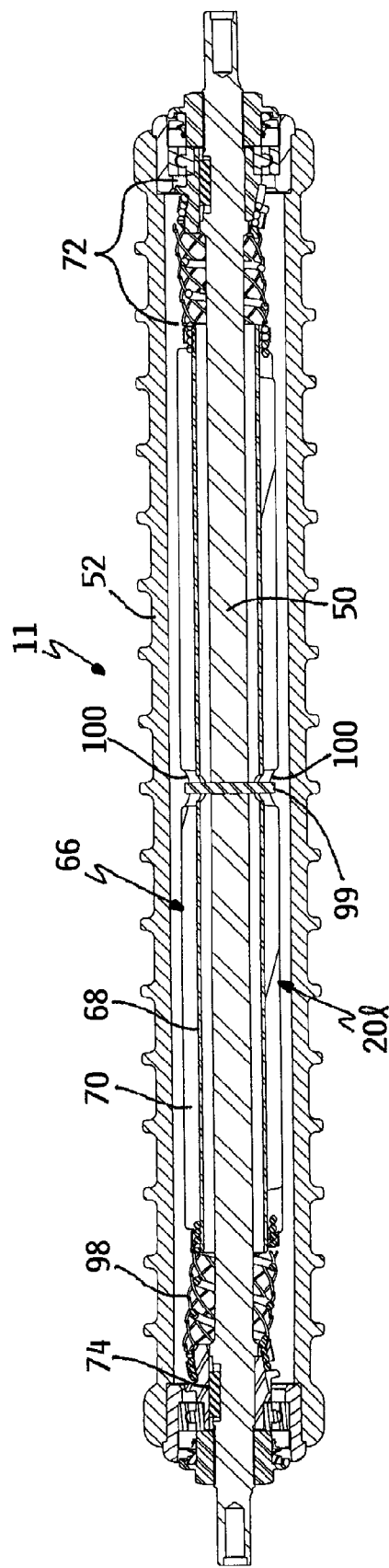
FIG. 17 is a cross-sectional view through the length of the front roller of the cutting unit of FIG. 12 taken along lines 17-17 in FIG. 12, particularly illustrating the fifth mass damper positioned around the roller through shaft.

Referring first to FIG. 14, each component set 72 includes a cylindrical damper support 74 that is slipped onto one end of through shaft 50. The inner diameter of damper support 74 has a keyway 76 to receive a key 78 that protrudes radially outwardly from through shaft 50. Key 78 prevents damper support 74 from rotating on through shaft 50 so that damper support 74 can be thought of as a fixed support provided on through shaft 50. Damper support 74 will also not slip off through shaft 50 as it is pressed inwardly and held in place by the previously described component stack 54 used to mount and seal roller body 52. See FIGS. 17 and 18 which shows roller bearing 56 abutting against damper support 74 to fix the position of damper support 74 along through shaft 50.

A coil spring 80 couples each damper support 74 to one end of mass damper $20_e$. Springs 80 are identical to one another. Each spring 80 has a plurality of tightly wound end turns 82 at each end that are spaced apart by a few less tightly wound center turns 84 forming the middle of each spring 80. End turns 82 of spring 80 terminate in a longitudinally extending finger 86. Thus, as shown in FIG. 14, the left end of spring 80 has a finger 86 that points towards damper support 74 and the right end of spring 80 has a finger 86 that points towards the adjacent end of mass damper $20_e$.

Damper support 74 has a cylindrical spring mounting hub 88 that receives thereon the tightly wound end turns 82 on one end of spring 80, i.e. the turns on the left end of spring 80 in FIG. 14. Similarly, the protruding end of inner steel tube 68 on mass damper $20_e$ is designed to receive the tightly wound end turns 82 on the right end of spring 80 in FIG. 14. A pair of generally circular clamps 90 surround each set of end turns 82 to clamp the ends of spring 80 in place to hub 88 of damper support 74 as well as to inner steel tube 68 of mass damper $20_e$. Clamps 90 can be crimped or deformed in place after they are overlaid around end turns 82 of spring 80. To further help secure spring 80 to damper support 74 and mass damper $20_e$ and to help prevent loosening of clamps 90, the protruding fingers 86 on spring 80 will fit into longitudinal slots 92 provided on damper support 74 and outer tube 70 of mass damper $20_e$ when both ends of spring 80 are received respectively on hub 88 of damper support 74 and on the protruding inner steel tube 68 of mass damper $20_e$. See FIG. 16.

Figure 18:
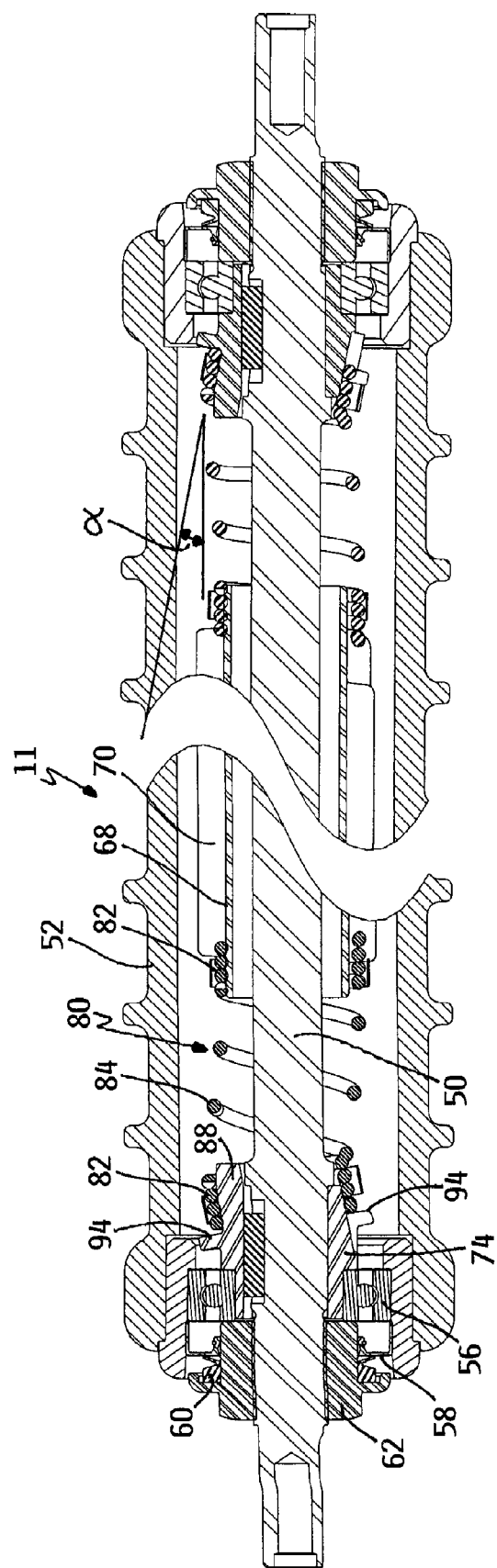
FIG. 18 is an enlarged cross-sectional view similar to FIG. 17 but showing only the opposite ends of the front roller of the cutting unit of FIG. 12 with the middle portion of the front roller having been broken away, particularly illustrating the damper supports fixed to each end of the through shaft and the coil springs that couple the damper supports to the left and right ends of the fifth mass damper but with the mesh sleeves that normally surround the coil springs being removed from FIG. 18 for the purpose of clarity.

Hub 88 of each fixed damper support 74 angles upwardly as it extends inwardly towards mass damper $20_e$. This is best shown in FIG. 18 by the angle α. In other words, the axis of hub 88 is not the same as the axis of the rest of damper support 74 and is not parallel to the axis of damper support 74 or to the axis of through shaft 50. Damper support 74 has a radial flange 94 that is perpendicular to hub 88. Accordingly, flange 94 is slanted or inclined rearwardly as flange 94 extends upwardly, also as shown in FIG. 18, due to the angle α of hub 88.

When end turns 82 on spring 80 surround hub 88, the last turn will abut against flange 94 with finger 86 extending into slot 92. Flange 94 is actually on a helix corresponding to the helix of the tightly wound end turns 82 so that the last turn on spring 80 will lie flush against the inner face of flange 94. Slot 92 is positioned to receive finger 86 with finger 86 extending outwardly through a gap 96 in flange 94 between offset helical ends of flange 94. In other words, flange 94 does not extend a full 360° around the circumference of damper support 74 but somewhat less than 360° to provide gap 96 through which finger 86 extends to enter slot 92. See FIG. 16.

The purpose for the angled hub 88 is to compensate for the weight of mass damper $20_e$. Two coil springs 80 are used to hold each end of mass damper $20_e$ to an adjacent fixed damper support 74. If springs 80 were set strictly horizontal, then the weight of mass damper $20_e$ would cause springs 80 to deflect or sag between the ends of the springs 80. Thus, mass damper $20_e$ would sink below its optimal, generally horizontal position.

However, by angling up hubs 88 of damper supports 74 to begin with, mass damper $20_e$ comes back down to a generally horizontal position when springs 80 deflect or sag. This is a position in which the hollow mass damper $20_e$ is centered around through shaft 50 and can move up and down relative to through shaft 50 in substantially equal amounts. The angling of hubs 88 is a simple, mechanical way of compensating for the inevitable deflection or sagging of springs 80 when springs 80 are used in the manner shown herein. Even after such deflection or sagging occurs, the hollow cylinder 66 comprising mass damper $20_e$ is still substantially centered on but spaced from through shaft 50.

An extruded polyethylene mesh sleeve 98 is desirably installed around the outer diameter of each coil spring 80. When untensioned, mesh sleeve 98 has a diameter that is normally less than the outside diameter of spring 80, i.e. a 1" inner diameter of mesh sleeve 98 compared to a 1.375" outer diameter of spring 80. Thus, when mesh sleeve 98 is installed around spring 80, it will be stretched out somewhat by spring 80. This ensures that mesh sleeve 98 will exert a frictional force on spring 80 during use of mass damper $20_e$. The Applicants have found that the frictional force arising from the use of mesh sleeve 98 can desirably modify the response characteristics of spring 80.

Mass damper $20_e$ is designed to move primarily vertically up and down in a counter motion to the up and down bouncing or bobbing of cutting unit 10 to damp or lessen this bouncing or bobbing. Mass damper $20_e$ is able to do this even though it is housed within a rotating part, namely within a rotating ground engaging roller 11. Mass damper $20_e$ does not itself substantially rotate, but is simply packaged within a rotating part. As mass damper $20_e$ moves up and down, mass damper $20_e$ engages against through shaft 50 before touching the inner diameter of roller body 52.

A vertical stop pin 99 is fixed to through shaft 50 and extends vertically through holes 100 in the top and bottom of mass damper $20_e$. Stop pin 99 prevents mass damper $20_e$ from sliding axially on through shaft 50 so far that coil springs 80 become disconnected. This is useful when assembling the mass damper $20_e$ or if the mass damper $20_e$ is used in a roller 11 that is installed on a cutting unit 10 that can be folded up into a vertical transport position. In this latter situation, the mass damper must be prevented from substantially sliding downwardly on the through shaft 50 when cutting unit 10 is oriented vertically during transport.

The up and down movement of mass damper $20_e$ will occur counter to the movement of cutting unit 10. When cutting unit 10 is bouncing up, mass damper $20_e$ will be deflecting down inside roller 11 with springs 80 bending downwardly over the central turns 84 of springs 80. Similarly, when cutting unit 10 is bouncing down, mass damper $20_e$ will be deflecting up in a counter motion. The reason for centering cylinder 66 that forms mass damper $20_e$ around through shaft 50 is to permit relatively equal amounts of up and down movement of mass damper $20_e$. If such an equal up and down range of motion were not desired, then centering of mass damper $20_e$ would not be needed.

Figure 19:
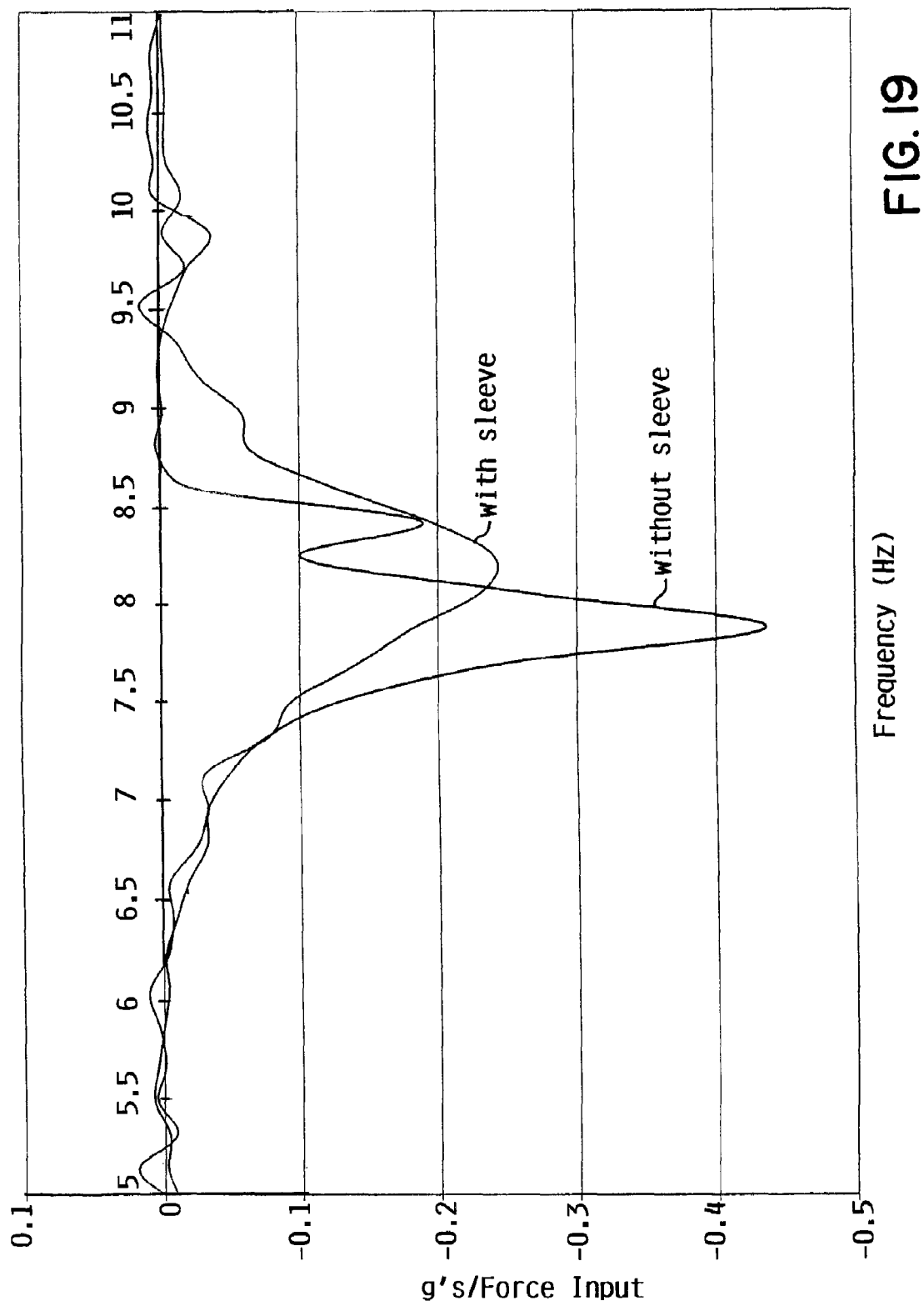
FIG. 19 is a plot of the spring response of a mechanical coil spring with and without the mesh sleeve installed around the coil spring.

As shown in FIG. 19, springs 80 disclosed herein have a sharp and narrow response around the frequency to which mass damper $20_e$ has been tuned. For example, assuming the weight of mass damper $20_e$ and the stiffness of spring 80 has been tuned to damp motion occurring at 8 hz, mass damper $20_e$ will move sharply at around 8 hz but will not move at frequencies much below or above 8 hz. The Applicants have found that plastic mesh sleeves 98 and the friction they impose on springs 80 will broaden the spring response and decrease the amplitude of motion of mass damper $20_e$. This is shown graphically in FIG. 19 which compares the large, narrow response of a spring having no sleeve with the smaller, broader response of a spring having an installed mesh sleeve.

The smaller, broader spring response resulting from the use of plastic mesh sleeves 98 is preferred. Since the actual frequency of the bouncing and bobbing varies somewhat with the turf conditions, and since the turf conditions can change from one day to the next, the bouncing or bobbing might occur one day at the nominal frequency range to which mass damper $20_e$ is tuned but at somewhat higher or lower frequencies when the turf is dryer or wetter than on the first day. The broader response provided by using sleeves 98 is better able to damp the bouncing or bobbing of the cutting units 10 despite this slight, normal variation in the frequency of the bouncing or bobbing.

The Applicants have found that placing a mass damper $20_e$ as shown in FIGS. 12-18 in both rollers 11 of reel 40 cutting unit is most effective in damping the rhythmic bouncing or bobbing of cutting unit 10. The total mass required for damping purposes can thus be split into two parts so that two smaller mass dampers are used instead of one big mass damper. Making each mass damper as small as possible also simplifies the task of placing mass damper $20_e$ within roller 11 as well as maximizes the vertical up and down travel of mass damper $20_e$.

In addition, having both a front and rear mass damper $20_e$ will damp the bouncing or bobbing generally equally on the front and back of cutting unit 10. Using only one mass damper $20_e$ in one roller 11 was found to effectively damp bobbing of that end of cutting unit 10 carrying that roller 11, but it did not as effectively damp bobbing of the opposite end of cutting unit 10. Having two mass dampers $20_e$ in the front and rear rollers 11 solved this problem and contributed to even damping on both the front and rear ends of cutting unit 10.

Mass damper $20_e$ of FIGS. 12-18 is also believed to have a novel and unique structure compared to known mass dampers. As noted earlier, it provides damping in opposed straight line directions even though it is mounted within a rotary part. As such, mass damper $20_e$ can be applied to many fields other than mowers. Moreover, mass damper $20_e$ is supported and coupled to a frame using simple and durable mechanical components, such as a cylindrical damper support 74, a coil spring 80, a plastic mesh sleeve 98, etc. Mass damper $20_e$ will be reliable and durable in use.

Various other modifications will be apparent to those skilled in the art. For example, while rollers 11 equipped with mass dampers $20_e$ have been shown for use on reel cutting units 10, they could be used on cutting units having one or more rotary cutting blades that rotate in substantially horizontal cutting planes about substantially vertical axes, or on other types of roller supported turf maintenance equipment. Accordingly, the invention is to be limited only by the appended claims.

We claim:
1. A mower, which comprises:
(a) a frame supported for movement over the ground;
(b) a plurality of individual reel cutting units carried on the frame to be propelled by the frame over the ground, wherein each cutting unit is individually supported for rolling over the ground by at least one ground engaging member carried on each cutting unit, wherein each cutting unit further comprises:
  (i) a cutting unit frame having a to wall and a pair of laterally spaced side walls;
  (ii) a reel having a plurality of blades, the reel being rotatably journalled between the side walls and positioned beneath the top wall of the cutting unit frame; and
  (iii) a bedknife secured to the cutting unit frame to be positioned adjacent the reel such that grass is swept by the blades of the reel against the bedknife to be cut by the bedknife; and
(c) an individual mass damper mounted on the cutting unit frame of each one of the individual cutting units, wherein each mass damper comprises an autonomous body that is coupled to the cutting unit frame by a pair of elastomeric couplers which permit the body to move relative to the cutting unit frame and with the body having a mass and the couplers having a stiffness that is chosen to produce a vertical movement of the body of the mass damper that counters a vertical bouncing or bobbing of the cutting unit as the cutting unit rolls over the ground, wherein the body is generally U-shaped and comprises a pair of forwardly extending attachment arms located on either end of a central bar shaped portion with one attachment arm being secured to each of the elastomeric couplers, the central bar shaped portion of the body being located below and behind the to wall of the cutting unit frame when the body is mounted by the attachment arms thereof to the couplers to facilitate the connection of the cutting unit frame to the frame of the mower.

2. The mower of claim 1, wherein the frame of the mower supports an operator thereon such that the mower is a riding mower, wherein each individual cutting unit is attached to the frame by an individual lift arm to allow each cutting unit to be lowered and raised into and out of contact with the ground, respectively, by operation of the corresponding lift arm.

3. The mower of claim 1, wherein the elastomeric couplers overlie the top wall of the cutting unit frame with the elastomeric couplers being laterally spaced apart such that the couplers are proximate to opposite lateral sides of the top wall, and wherein the attachment arms angle upwardly as the attachment arms extend forwardly from the central bar shaped portion to allow the attachment arms to reach the couplers while permitting the central bar shaped portion to remain below and behind the top wall of the cutting unit frame.

4. The mower of claim 3, wherein a pair of laterally spaced apart bedknife adjusters is carried on the cutting unit frame above the top wall thereof with the bedknife adjusters being proximate to the opposite lateral sides of the top wall, and wherein the elastomeric couplers are mounted to housings of the bedknife adjusters.

* * * * *

UNITED STATES PATENT AND TRADEMARK OFFICE
CERTIFICATE OF CORRECTION

| | | |
|---|---|---|
| PATENT NO. | : 7,934,364 B1 | Page 1 of 1 |
| APPLICATION NO. | : 12/715932 | |
| DATED | : May 3, 2011 | |
| INVENTOR(S) | : Gerald E. Goman et al. | |

It is certified that error appears in the above-identified patent and that said Letters Patent is hereby corrected as shown below:

Col. 12, Lines 10 and 35, change "to wall" to --top wall--.

Signed and Sealed this
Twenty-fifth Day of October, 2011

David J. Kappos
*Director of the United States Patent and Trademark Office*